US008260472B2

(12) United States Patent
Hoffman et al.

(10) Patent No.: US 8,260,472 B2
(45) Date of Patent: Sep. 4, 2012

(54) COOLING SYSTEM FOR POWER TRANSFORMER

(75) Inventors: Gary R. Hoffman, Randolph, NJ (US); Jeffrey Anderson, Pullman, WA (US)

(73) Assignee: Advanced Power Technologies, LLC, Randolph, NJ (US)

( * ) Notice: Subject to any disclaimer, the term of this patent is extended or adjusted under 35 U.S.C. 154(b) by 495 days.

(21) Appl. No.: 12/381,184

(22) Filed: Mar. 9, 2009

(65) Prior Publication Data

US 2009/0315657 A1 Dec. 24, 2009

Related U.S. Application Data

(60) Provisional application No. 61/132,604, filed on Jun. 21, 2008.

(51) Int. Cl.
*G06F 19/00* (2011.01)

(52) U.S. Cl. .......................... 700/299; 702/182; 340/646

(58) Field of Classification Search .................. 700/299, 700/300; 702/182; 336/57; 706/2; 374/152; 340/646

See application file for complete search history.

(56) References Cited

U.S. PATENT DOCUMENTS

| | | | | |
|---|---|---|---|---|
| 4,512,382 | A * | 4/1985 | Gibson | 152/408 |
| 4,623,265 | A * | 11/1986 | Poyser | 374/152 |
| 5,828,881 | A * | 10/1998 | Wang | 719/314 |
| 6,424,266 | B1 * | 7/2002 | Weekes et al. | 340/588 |
| 6,714,022 | B2 * | 3/2004 | Hoffman | 324/547 |
| 6,742,342 | B1 * | 6/2004 | Bonaquist et al. | 62/52.1 |
| 6,842,718 | B2 * | 1/2005 | Byrd et al. | 702/182 |
| 6,909,349 | B1 * | 6/2005 | Longardner et al. | 336/60 |
| 6,962,435 | B2 * | 11/2005 | Stenestam | 374/152 |
| 2002/0115599 | A1 * | 8/2002 | Vernos et al. | 514/12 |
| 2004/0158428 | A1 * | 8/2004 | Byrd et al. | 702/182 |

* cited by examiner

*Primary Examiner* — Kidest Bahta
(74) *Attorney, Agent, or Firm* — Henry I. Schanzer, Esq.

(57) ABSTRACT

A system for cooling a power transformer which generates heat, when driving a load, includes cooling devices, such as fans and pumps, located about the transformer, which are powered for circulating a coolant about the transformer. Each cooling device has a motor which is energized in response to given temperature (heat) conditions. In systems embodying the invention, the currents flowing through the motors of cooling devices are sensed and monitored to determine whether the cooling devices are functioning correctly and to substitute functional cooling devices for those which are malfunctioning. Sensing the currents in the motors enables the early detection of fault conditions in the cooling system. It also enables the monitoring of operating conditions and running time of the cooling devices to aid in the maintenance and operation of the cooling system.

22 Claims, 11 Drawing Sheets

COOLING SYSTEM FOR POWER TRANSFORMER

This invention claims priority from provisional application Ser. No. 61/132,604 for Transformer Cooling Monitor And Control System filed Jun. 21, 2008 whose teachings are incorporated herein

BACKGROUND OF THE INVENTION

This invention relates to apparatus and methods for monitoring and controlling the cooling system of power transformers.

Power transformers designed to distribute large amounts of power, such as substation and distribution class power transformers generally include cooling systems to remove heat generated when large loads are applied to the transformers (i.e., when large currents are drawn from and through the transformer). The cooling systems are designed to remove heat to help keep the transformer and its components below predetermined critical temperatures. Maintaining the transformer temperature below a critical value enables the transformer to handle a designed load capacity or to increase the power handling capability of the transformer.

The cooling systems may include cooling fans to circulate air over the transformer. Alternatively, the transformer may be contained within a liquid (e.g., oil) filled tank with oil pumps being used to circulate the fluid through radiators attached to the tank and cooling fans circulating air over the radiators. The operation of the cooling system is vital for the transformer to deliver its designed power capacity. If the cooling is compromised, the transformer temperature may rise above desired values. Such a rise in temperature may result in the outright failure of the power transformer and at a minimum will result in some damage and an accelerated loss of life. That is, over time excessive heating will reduce transformer life and lead to premature failure which will affect the ability of a utility company to supply uninterrupted supply of power to its customers and will cost the operating utility significant replacement costs.

Problems with prior art systems may be explained with reference to FIGS. 1, 1A and 2, which show a housing 100 enclosing a power transformer 120. As is known in the art, the primary and secondary windings of the transformer have some resistance (R). As current (I) flows through the windings, heat is generated which is a function of the winding resistance multiplied by the square of the current (i.e., $I^2R$). A considerable amount of heat may be generated by, and within, the power transformer, particularly when the load is increased and more current flows through the transformer's primary and secondary windings.

The heat generated within the transformer causes a rise in the temperature of the windings and in the space surrounding the windings and all around the transformer. When the temperature rises above a certain level many problems are created. For example, the resistance of the (copper) transformer windings increases as a function of the temperature rise. The resistance increase causes a further increase in the heat being dissipated, for the same value of load current, and further decreases the efficiency of the transformer. With increased temperature the transformer may also be subjected to increased eddy current and other losses. The temperature rise may also cause unacceptable expansion (and subsequent contraction) of the wires. Also, the insulation of the windings and other components may be adversely affected. Temperatures above designed and desirable levels result in undesirable stresses being applied to the transformer and or its components. This may cause irreversible damage to the transformer and its associated components and at a minimum creates stresses causing a range of damages which decrease its life expectancy.

It is therefore desirable and/or necessary to maintain the temperature of the power transformer below a predetermined level.

In FIGS. 1 and 1A the transformer 120 may be cooled by immersing the transformer in a liquid (e.g., oil) and having the liquid flow through pipes 110 extending through the radiators (e.g., 2 and 41). Pumps (not shown) may be used to circulate the liquid (oil) through the radiators where the liquid may be subjected to cooling by means of cooling fans 6 and 7. A bank of cooling fans 6 and 7 (three fans are shown in bank 6 in FIG. 1) may be used to selectively blow air, or any other suitable coolant, over radiators (e.g., 2 and 41) to cool the liquid as it passes through the radiators. FIGS. 1 and 1A show: (a) a sensor 42 designed to sense the winding temperature which is coupled to a winding temperature control module 4 having an indicator for displaying the transformer winding temperature; and (b) a sensor 82 designed to sense the top oil temperature coupled to a top oil temperature control module 8 with an indicator for displaying the temperature of the top oil. The signals from sensors 42 and 82 are processed by their respective modules. When predetermined temperature levels are reached, the cooling fans 6 and 7 are powered by signals generated by and within fan motor control modules 4 and 8 in response to the signals generated by temperature sensors 42 and 82.

FIG. 2 illustrates circuitry, which may be contained in a control cabinet 3 attached to housing 100, for applying power to the fan motors to drive the fans. Control module 4 includes means for processing signals from sensor 42 and to generate a command signal applied to a motor winding control circuit 421 which, in turn, functions to control (turn-on and turn-off) switch 6S which then applies power to the motors (FM1, FM2, FM3) of cooling fans 6A, 6B and 6C In a similar manner, control module 8 includes means for processing signals from sensor 82 and to generate a command signal to a motor winding control circuit 821 which, in turn, functions to control switch 8S which then applies power to the motors (FM4, FM5, FM6) of cooling fans 7A, 7B and 7C.

Admittedly, the prior teaches the use of cooling systems to protect a power transformer from excessive temperatures. However, a problem with known prior art systems, as illustrated in FIGS. 1, 1A and 2, is that, in the event the cooling system fails, the temperature limits will be reached and/or exceeded before any corrective action can be taken. For example, if fan control switch 6S or 8S fails and/or in the event that a fan motor fails, the cooling of the power transformer is partially or wholly compromised. There is no provision which indicates the failure of the cooling device until the rise in temperature exceeds given limits and an alarm is sounded. Due to the large mass of the transformer system (there is a large thermal coefficient), by the time an alarm is sounded and corrective action is taken, the temperature of the transformer and associated components may rise considerably above desired and or design limits resulting in damage to the system.

Clearly, the prior art does not address the problem which arises when malfunctions and failures of the cooling system are not detected early and quickly. The prior art also does not address the need to monitor the functionality of the cooling system components. These problems and other drawbacks present in the prior art are overcome in systems embodying the invention.

SUMMARY OF THE INVENTION

A power transformer generates heat when supplying power to a load. Typically, several cooling devices are mounted on or about the power transformer and are operated (e.g., turned-on or energized) to remove excessive heat from the transformer so as to try to maintain the temperature of the transformer below predetermined levels. The cooling devices may include: (a) fans to blow a gaseous coolant (e.g., air) onto the transformer or onto radiators carrying a liquid coolant in contact with the transformer; and/or (b) pumps for circulating a liquid coolant (e.g., oil) about the transformer. The cooling devices of interest have a motor (e.g., a fan motor or a pump motor) which is energized in response to given temperature and/or heating conditions. In accordance with the invention, the currents flowing through the motors of cooling devices are sensed and monitored to determine whether the cooling devices are functioning correctly. The importance of sensing the motor currents is that it provides an immediate indication of the malfunction of its corresponding cooling device. This is highly significant since a failure of the cooling devices to perform its intended task is not immediately detectable due to the large thermal constants associated with the relatively massive power transformer assembly. Sensing the currents in the motors of the cooling devices enables the early detection of fault conditions. It also enables the monitoring of the operating conditions of the cooling devices for proper maintenance and operation of the entire cooling system.

In accordance with the invention the current in the motors of cooling devices (e.g., fans and/or fluid circulating pumps) is sensed to determine the operability of the cooling devices and to provide an early indication if, and when, a cooling device is malfunctioning.

Systems embodying the invention include means for sensing the current flowing through the motors of N sets of cooling devices for determining whether the cooling devices are functioning properly and to enable the substitution of a device which is functioning properly for one which malfunctioning. The N sets of cooling devices may be intended to be powered in a given sequence under normal conditions, in response to predetermined temperature conditions. In the event the malfunction of a cooling device is detected, means responsive to the sensed motor currents cause the immediate powering of another one of the N sets of cooling devices for the set including the malfunctioning cooling device; where N is an integer equal to or great than two (2).

Furthermore, in accordance with the invention, each motor of a cooling device is controlled (turned on and off) in response to (a) a first signal responsive to the temperature conditions pertaining to the power transformer; and (b) a second signal responsive to the functionality condition (conduction) of the motor.

Systems embodying the invention having more than one cooling device (e.g., multiple cooling fans or pumps) may include means for selectively testing their operability and means for switching an operable cooling device for a malfunctioning cooling device.

Recognizing that the motor of a cooling device (e.g., a fan motor or a pump motor) is malfunctioning enables corrective action to be taken before critical temperatures are exceeded. This results in an earlier alert system if the sensed current indicative of a malfunction is sensed. That is, if there is a malfunction of the cooling system, there is no need to wait for the long thermal time constant of the transformer and its associated equipment to remediate problems with the cooling system.

Systems embodying the invention may also include applying cooling in stages. For example, for sensed temperature above a first level and below a second level a first set of cooling fans is turned on, then for temperatures above the second level and below a third level a second set of cooling fans is turned on, then for temperatures above the third level and below a fourth level a third set of cooling fans is turned on. In addition, the current level drawn by the fan motors in each set is sensed such that if any one of the fans is malfunctioning, another one of the fans is turned on instead.

Still further, the currents in the motors of the cooling devices may be processed such that in the event the fan motor currents are outside a prescribed range (above or below given limits), an alarm condition may be generated including alerting an operator to the potentially dangerous condition.

Systems embodying the invention may also include means for monitoring the length of time the motors are operated and the current drawn by the motors to determine when preventative maintenance and/or replacement of the motors is in order.

BRIEF DESCRIPTION OF THE DRAWINGS

In the accompanying drawings, which are not drawn to scale, like reference characters denote like components.

DETAILED DESCRIPTION OF THE INVENTION

As shown in FIGS. 3A, 3B, 4A and 4B, cooling systems embodying the invention include cooling devices, which when energized ("powered"), tend to maintain the temperature of an associated power transformer, 120, below predetermined values. Cooling devices used to illustrate the invention include cooling fans 6,7 for blowing a gaseous coolant and pump(s) for circulating a cooling liquid about a power transformer. These cooling devices have motors whose currents can be measured. However it should be appreciated that the invention may be practiced with any cooling device whose current and/or voltage and/or power usage can be sensed. As noted above, if there is a loss of coolant due to the failure of a cooling device there may be an uncontrolled rise in the temperature of the transformer and/or the oil circulating around the transformer and/or components associated with the transformer resulting in catastrophic failure of the transformer and/or it associated components. This application aims at resolving problems where loss of cooling occurs due to the failure of the fans and/or pumps to operate as intended.

Figure 1:
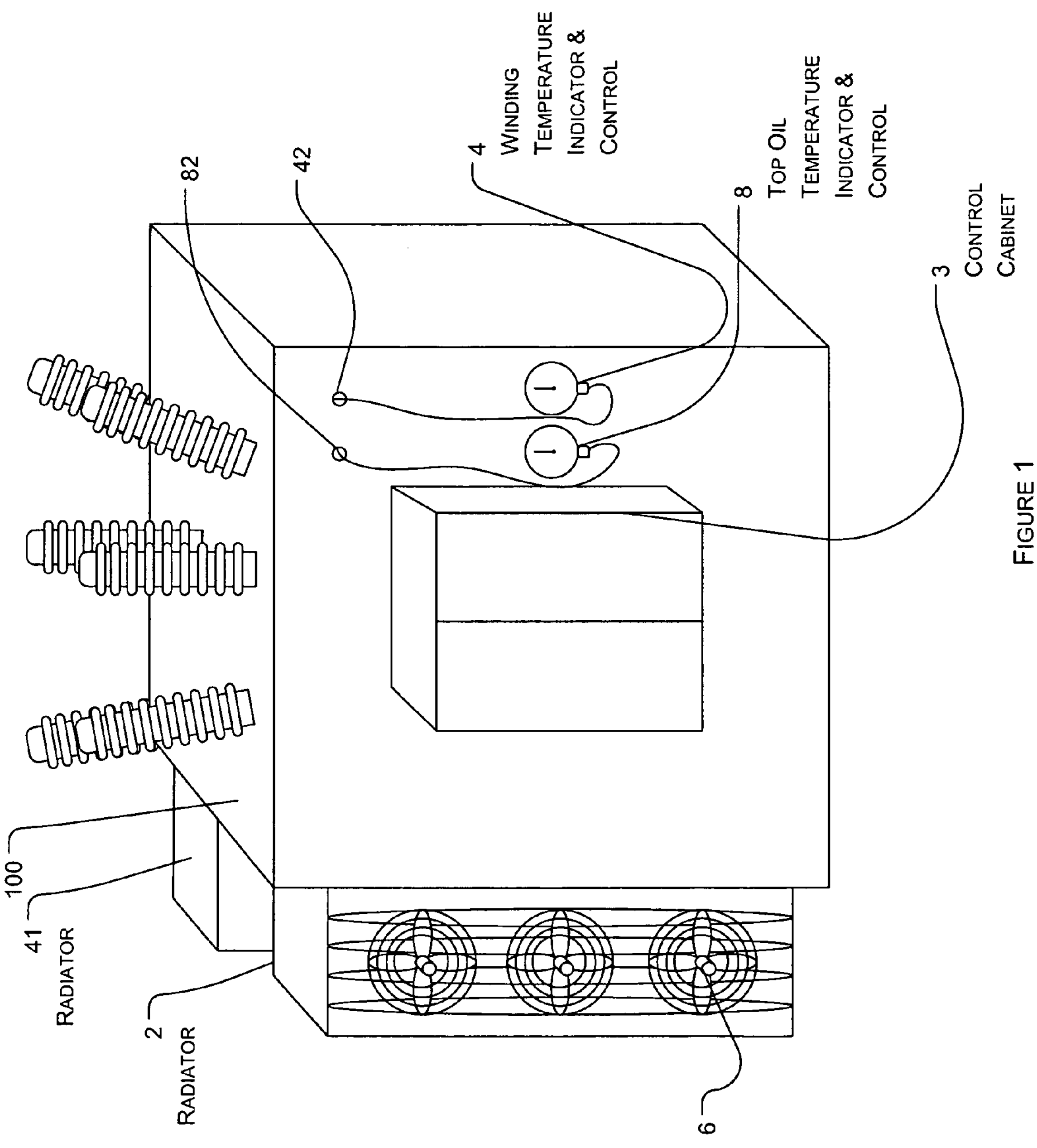
Figure 1 Prior Art
FIG. 1 is a simplified drawing of a prior art housing containing a power transformer with cooling fans mounted on radiators and including transformer winding and oil temperature indicators.
Figure 1A:
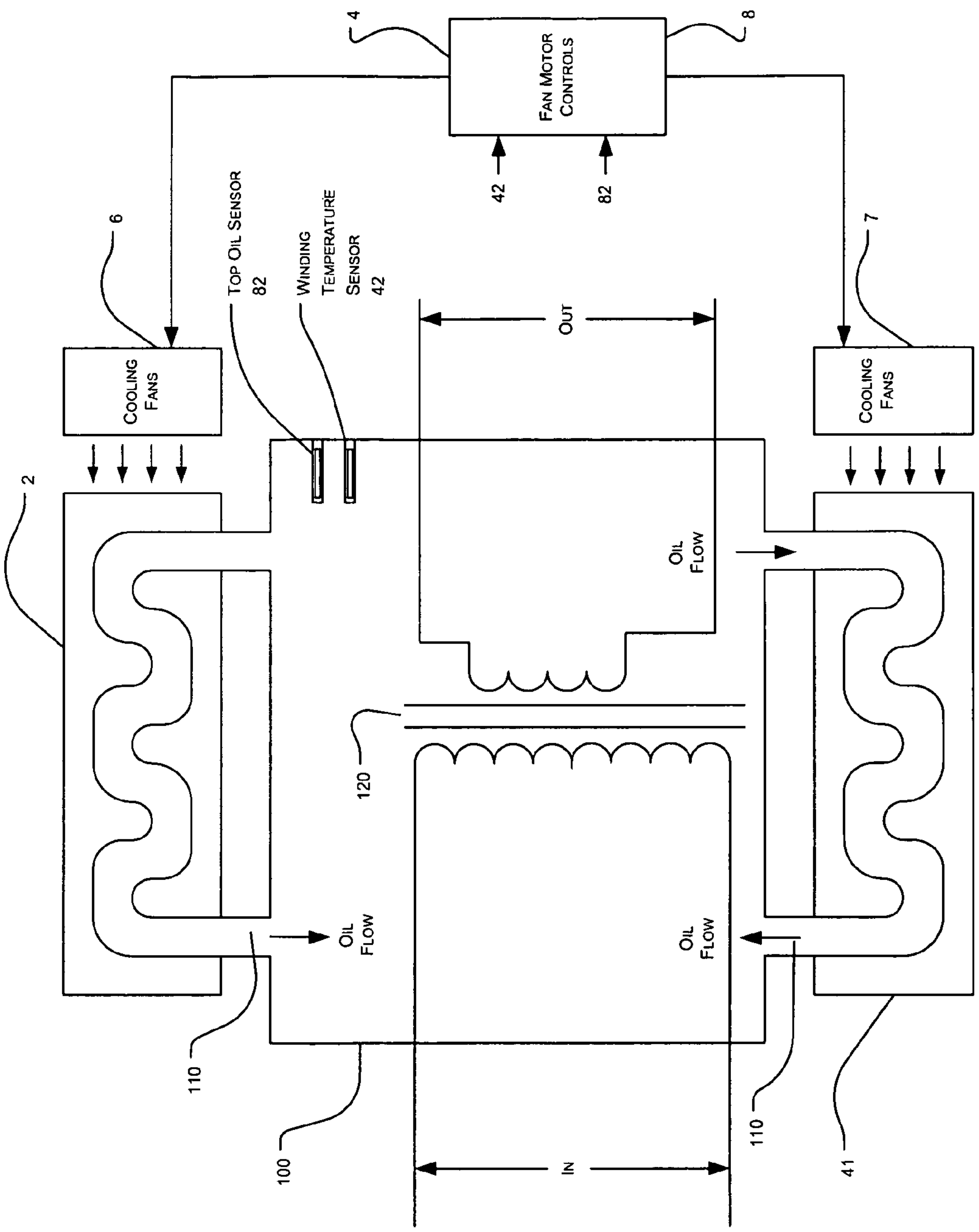
Figure 1A Prior Art
FIG. 1A is a simplified drawing of a prior art system showing a power transformer immersed in oil within a housing, as shown in FIG. 1, with cooling fans for cooling a liquid flowing through the radiators and control means for controlling the operation of the cooling fans.
Figure 2:
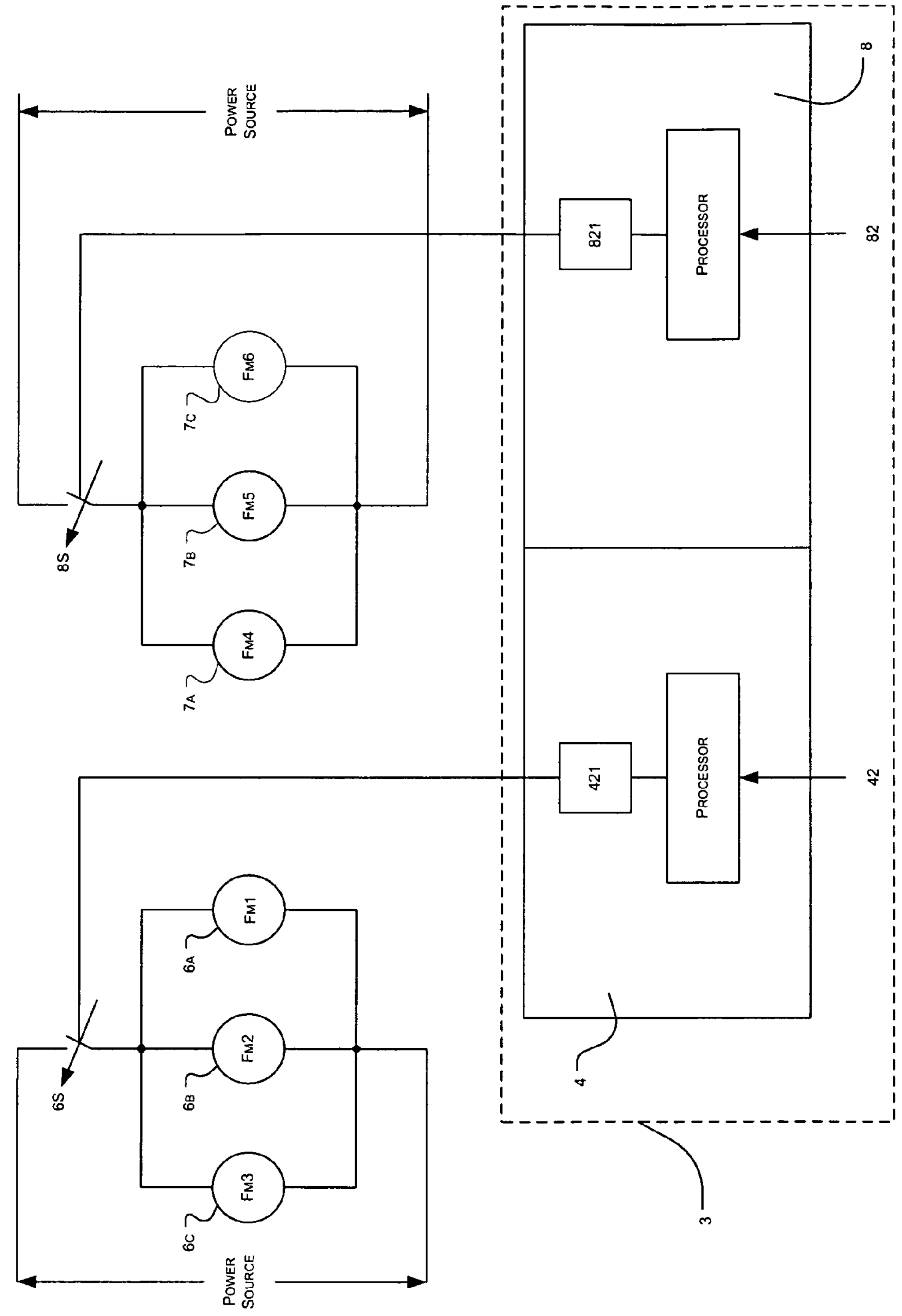
FIGURE 2 PRIOR ART
FIG. 2 is a simplified diagram of a prior art control system responsive to winding and oil temperature suitable for use in the system of FIGS. 1 and 1A.
Figure 3A:
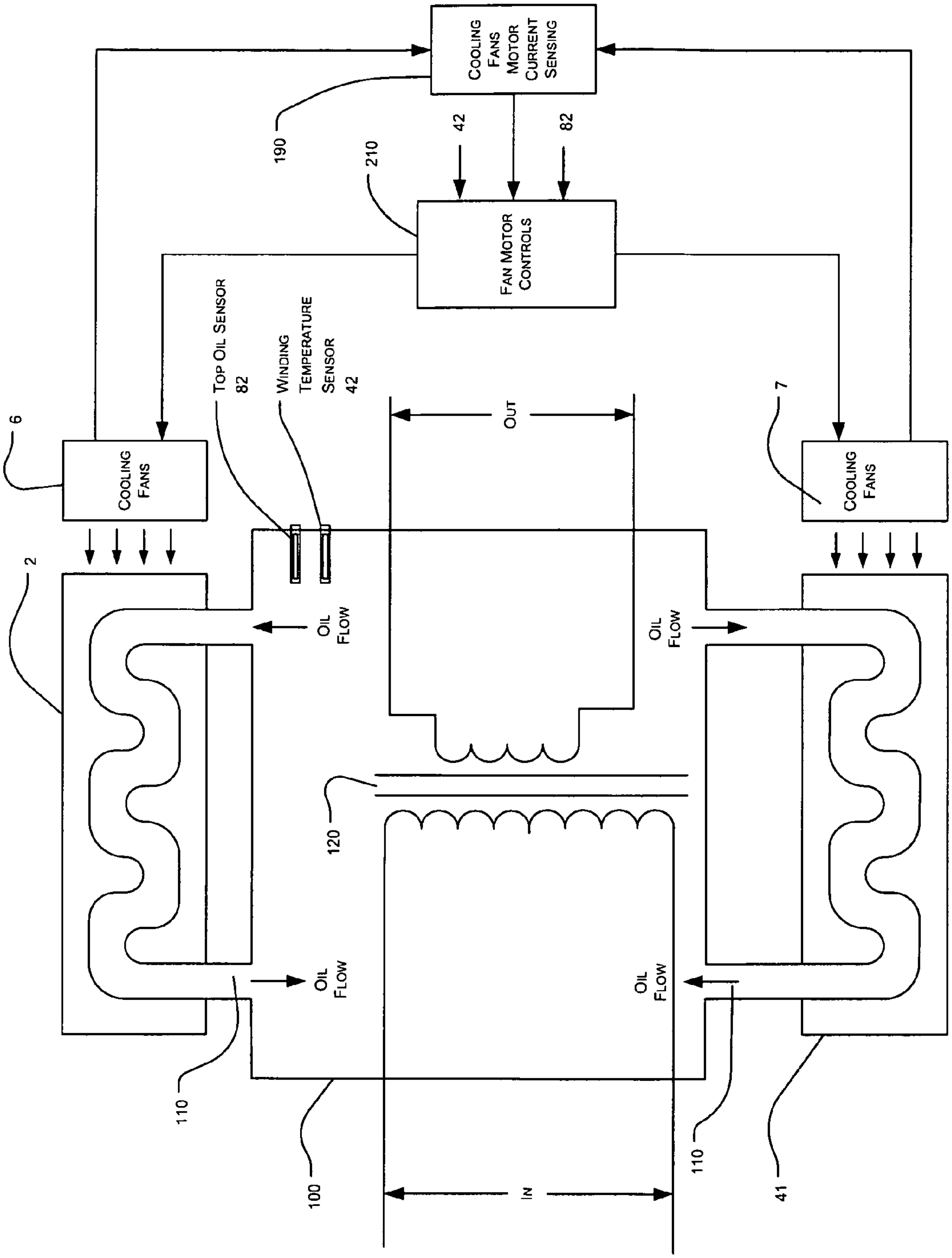
FIG. 3A is a simplified drawing of a system showing a power transformer immersed in oil within a housing with cooling fans for cooling a liquid flowing through the radiators and means for sensing the fan motor currents and control means for controlling the operation of the cooling fans in accordance with the invention.
Figure 3B:
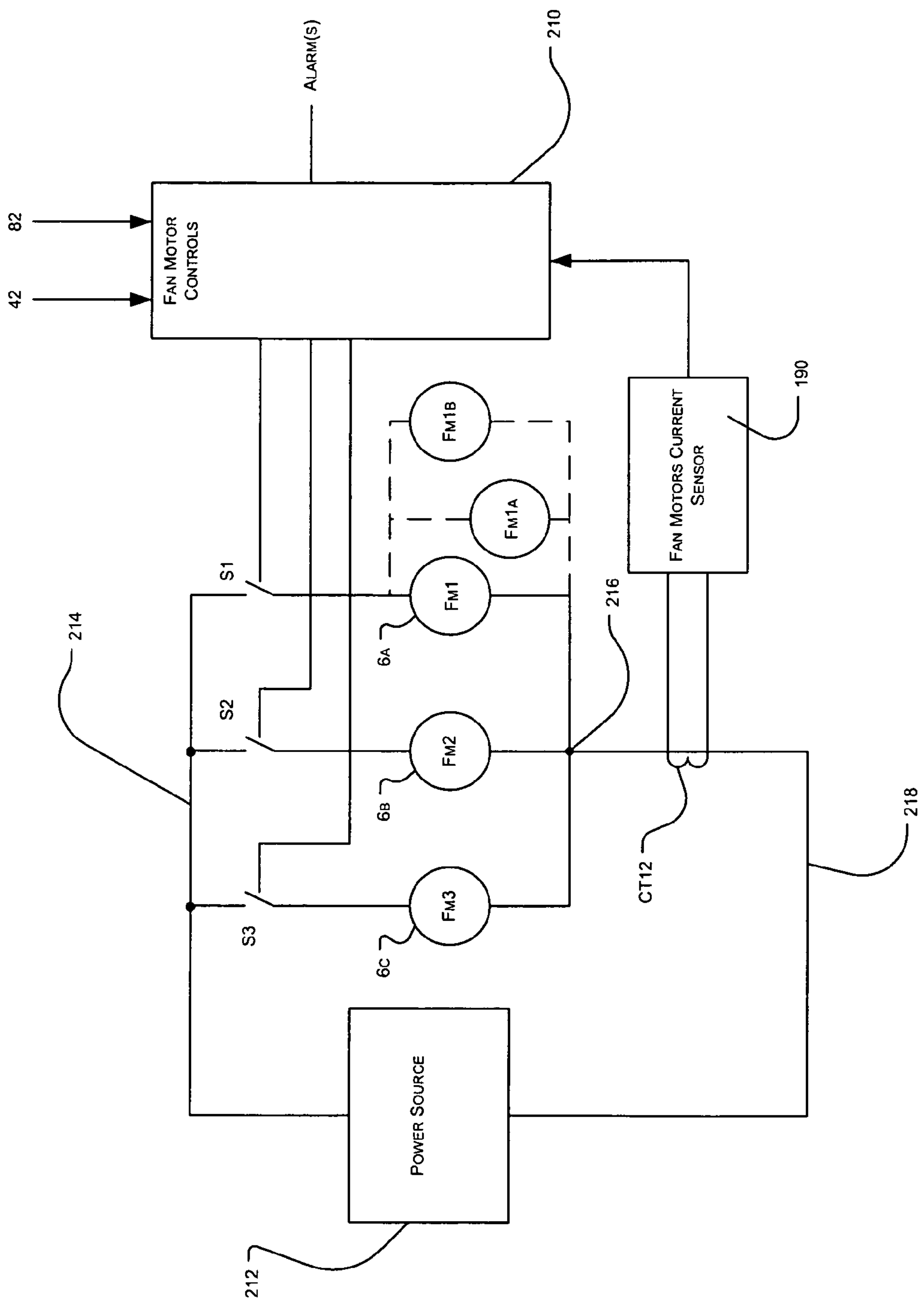
FIG. 3B is a simplified drawing illustrating the sensing of fan motor current and the operation of cooling fan motors in accordance with the invention.

As shown in FIGS. 3A and 3B, systems embodying the invention differ form prior art systems in that they include means 190 for sensing the current(s) drawn by the motors of cooling fans 6 and 7. The fan motor (FM) currents are sensed by means of a current transformer CT12, connected in series with the fan motors, whose output is fed to current sensor 190 and then to a module 210. The presence as well as the amplitude of the fan motor current (s) can be determined. The amplitude can be determined with processing circuitry in module 190 or in module 210. In the embodiment of FIGS. 3A and 3B it is assume that fan motor control module 210 is programmed to determine whether the fan motors are operating as intended (e.g., whether when energized a current flows and whether the amplitude of the current is within a prescribed range) and providing cooling to the transformer.

FIG. 3B, which illustrates a simplified version of the system operation, shows an AC power source 212 supplying its voltage between terminals 214 and 218. Three fan motors (FM1, FM2, FM3) are shown connected via respective switches (S1, S2, S3) between node 214 and an intermediate node 216. Node 216 is then connected via the primary winding of a current sensing transformer CT12 to terminal 218. The secondary winding of CT12 is shown connected to cooling fan current sensor 190 which is connected to control module 210. Current sensor 190 and module 210 include circuitry for: (a) sensing the presence and amplitude of the sensed current; (b) processing, analyzing and storing the sensed data; and (c) producing signals for energizing predetermined switches/devices and sounding alarms, if necessary. Sensor 190 and module 210 are shown as separate circuits. However, they may be part of the same module or integrated circuit The turn-on of switches S1, S2 and S3 is initiated by signals generated by temperature sensors 42 and/or 82 which are supplied to module 210 which is designed and programmed to respond to these signals. Sensors 42 and 82 may include any probe capable of sensing temperature and providing an appropriate signal to processing circuitry contained in module 210.

For purpose of example assume that when the temperature (T) is above a temperature T1 and below a temperature T2 switch S1 is to be closed supplying power to the FM1 and activating fan 6A. If the temperature (T) rises above T2, switch S2 is to be turned on (closed) supplying power to FM2 and activating fan 6B. If the temperature keeps on rising and reaches a level T3, then switch S3 is to be closed and power is supplied to FM3 activating fan 6C. It is assumed that the temperature T2 is greater than T1, T3 is greater than T2 and T4 is greater than T3. This describes the sequential activation of the fans, assuming they are all operating correctly. If the temperature rises above a level T4, an alarm is sounded to indicate the existence of an excessive condition. [Note: Three fans are shown for purpose of example only. There maybe more or less than three fans. Also, each one of FM1, FM2, FM3 may include a set of fans connected in parallel, as illustrated by FM1A and FM1B drawn in dashed lines in parallel with FM.]

However, in accordance with the invention, additional controls are place on the turn-on and turn off of the switches supplying power to the cooling devices, as discussed below. Assume now that S1 is closed and FM1 is to be powered. The current through FM1 is sensed by CT12 and processed in circuits 190 and 210. If the sensed current through FM1 is within a predetermined range, FM1 is determined to be operational and S1 is closed. If there is a malfunction in S1 or in FM1, the current through CT12 will reflect either; (a) an undercurrent condition (e.g., a partial or full open circuit) with the current being below a first value or (b) an overcurrent condition (e.g., a partial or full short circuit) with the current being above a second value. If a malfunction is sensed by sensor 190, it produces a corresponding output signal which is then supplied to module 210. Circuits 190 and 210 are designed and programmed to recognize the type of fault condition to enable a range of corrective actions to be undertaken. If the fault is significant, switch S1 is opened removing power from FM1. Concurrently, switch S2 is turned-on supplying power to FM2 and activating fan 6B and an alert signal may be produced indicating the nature of the fault. The corrective action taken can be supplied to the user (e.g., the entity having responsibility for the operation of the transformer). Also, the fault condition will be supplied to processing circuitry (not shown) tracking the condition of the cooling system and monitoring when needed maintenance is to be performed.

Likewise, if there is a malfunction in S2 or FM2, the sensed current through CT12 will be below or above a predetermined value. The sensed signal is sent to circuits 190 and 210 which are designed and programmed to recognize the type and nature of the fault condition. If the fault is significant, switch S2 is turned off removing power from FM2. Concurrently, a signal is generated to turn-on S3 supplying power to FM3, activating fan 6C, and alarms or alerts similar to those described above will be instituted and recorded. Thus, fault sensing of the cooling fans and correction for defective fans can be conducted automatically and the transformer power producing system is kept operational until an operator decides to take appropriate action. In brief, the current drawn by the fan motors is sensed such that, if any one of the fans is defective, another one of the fans is turned on instead. In addition, while remedial action is being taken an alarm may be generated to alert an operator to the potentially dangerous condition.

A significant feature of the system is that circuits 190 and 210 can be programmed to periodically and selectively test the operability of all the fan motors individually. That is, module 210 can be programmed to turn-on switch S1 (and turn off S2 and S3) and test for the presence and level of the current through FM1 sensed by CT12. Then S2 can be turned on and S1 and S3 turned off to test the operability of FM2. Then S3 can be turned on and S1 and S2 can be turned off to test the operability of FM3. This mode of operation permits the testing of each fan motor and the determination of its operating conditions and whether any fan motor is not operating correctly. This testing can be done on a regular basis to determine the operability of the cooling system. This enables preventive action to be taken at low cost and with little effort.

Figure 4A:
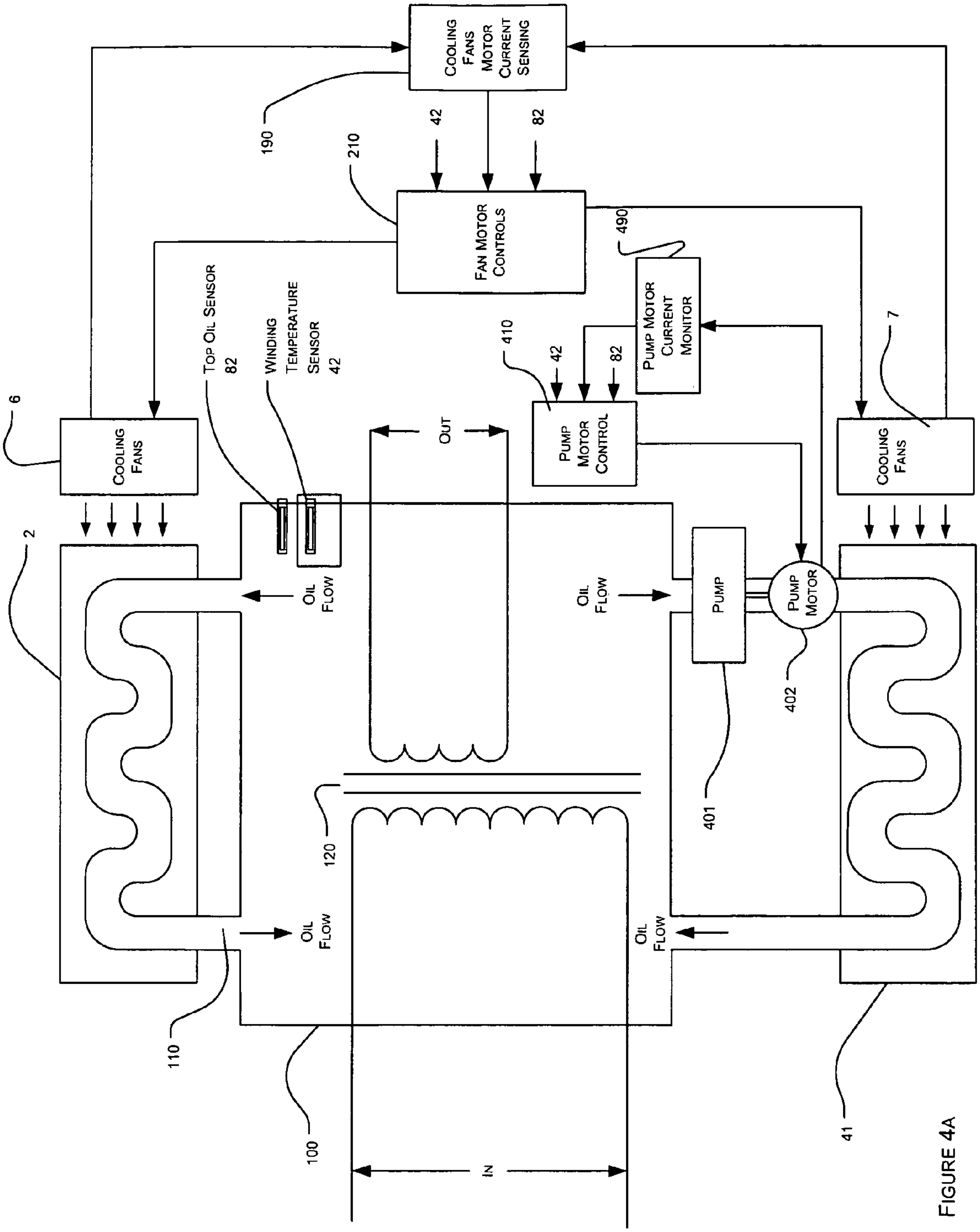
FIG. 4A is a simplified drawing of a system showing a power transformer immersed in a liquid coolant (e.g., oil) within a housing with a pump and pump motor for circulating the liquid and cooling fans for cooling the liquid flowing through the radiators and means for sensing the pump motor and fan motor currents and control means for controlling the operation of the pump motor and cooling fans, in accordance with the invention.
Figure 4B:
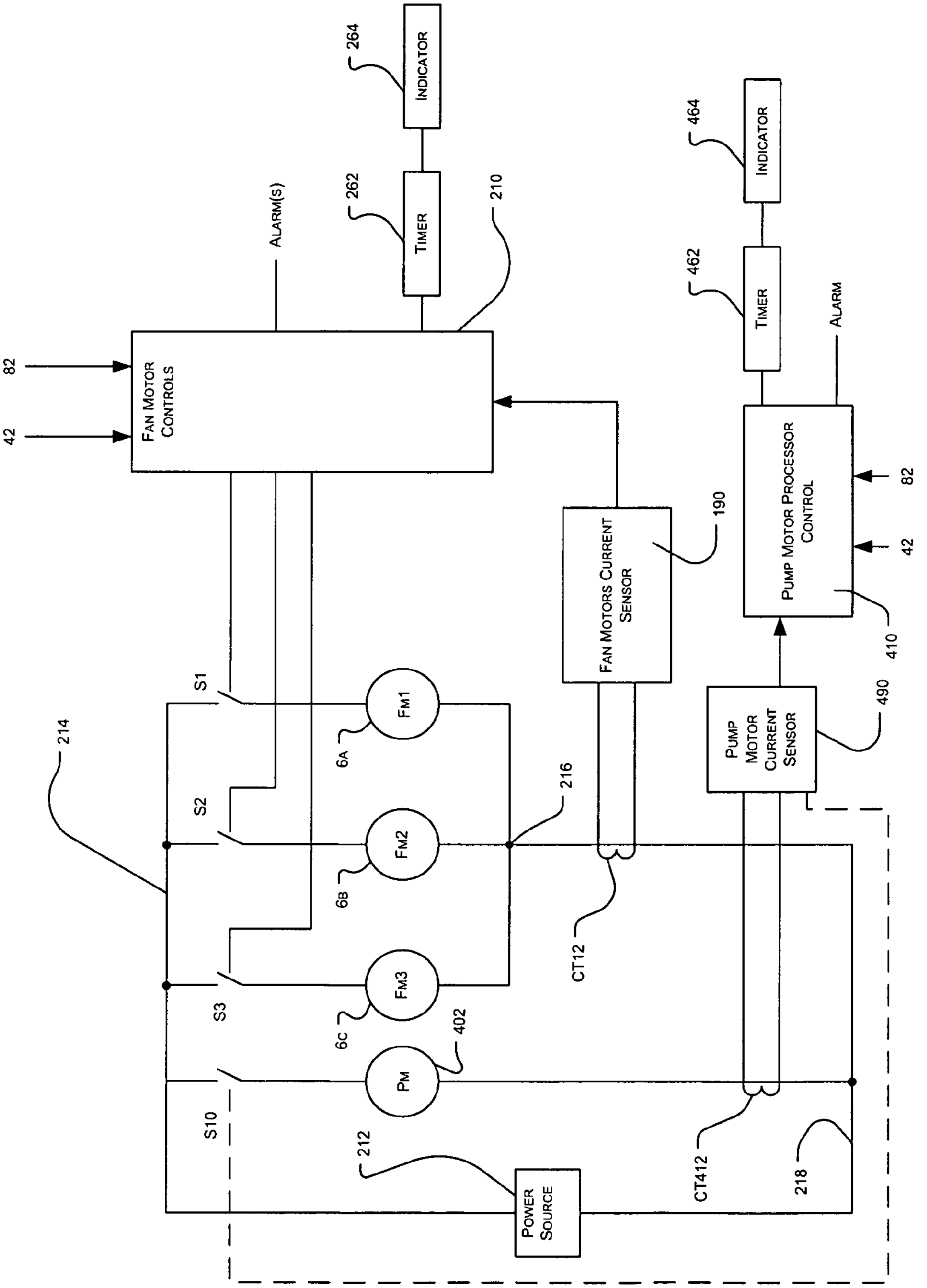
FIG. 4B is a simplified drawing illustrating the sensing of pump motor and fan motor currents and the operation of a pump motor and cooling fan motors in accordance with the invention.

FIGS. 4A and 4B illustrate that the transformer 120 may be contained within a housing 100 and a liquid coolant (e.g., oil)

may be circulated about the transformer and radiators 2 and 41 by means of a pump 401 which is operated by a pump motor (PM) 402. One pump is shown but there may be more than one. Similarly to the operation of the fan motors discussed above, the pump motor 402 may be energized by means of the turn-on of a switch S10 connected between the motor 402 and terminal 214. The current though the pump motor 402 may be sensed by means of a current transformer CT412 whose primary winding is connected in series with motor 402 between the motor and terminal 218. (Note that the current transformer in this instance and in the case of the fan motors may be located above or below the motor whose current it is sensing.) The pump motor is normally energized by closure of switch S10 which applies power to the motor. The closure of switch S10 is normally controlled by a pump motor processor control 410 in response to temperature signals from probes 42, 82 and/or any other suitable input (Tothers in FIG. 5). When switch S10 is closed a current flows through the motor. If the motor is operating as intended, the current level will normally be within a given range. If the motor is defective and/or if switch S10 is not functioning and/or if the pump 402 is malfunctioning, the sensed motor current will be outside the given range.

The current through the pump motor is sensed by CT412 which supplies the sensed signal to current sensor 490 and module 410 for processing the output of CT412 in a manner similar to that conducted by circuits 190 and 210, describe above. The sensor 490 includes processing circuitry for sensing the current level of the pump motor. If the current level of the pump motor is too high or too low there is an immediate detection of the problem condition and, depending on the extent of the fault condition, corrective actions are taken long before the resulting thermal conditions (e.g., overheating) are sensed. If more than one pump is used to service the system, they can be operated in a similar manner to that described for the fans.

As shown in FIG. 4B, systems embodying the invention include respective timer circuits (262, 462) to which are in turn connected to respective indicators (264, 464). These devices monitor the length of time devices are operated and enable an operator to schedule maintenance needs for the system.

It has been shown that, in accordance with the invention, circuitry operating the switch for energizing the motor of a cooling device may be designed to perform the following functions:

1—turn-on the switch to power the motor when a given temperature is reached;

2—turn-off the switch to remove power from the motor in the event of a malfunction of the motor and, concurrently, turn on the motor of another non-defective device; and 3—Selectively turn on the switch and apply power to the motor to test the operability of the motor for maintenance purposes and independently of temperature conditions.

Figure 5:
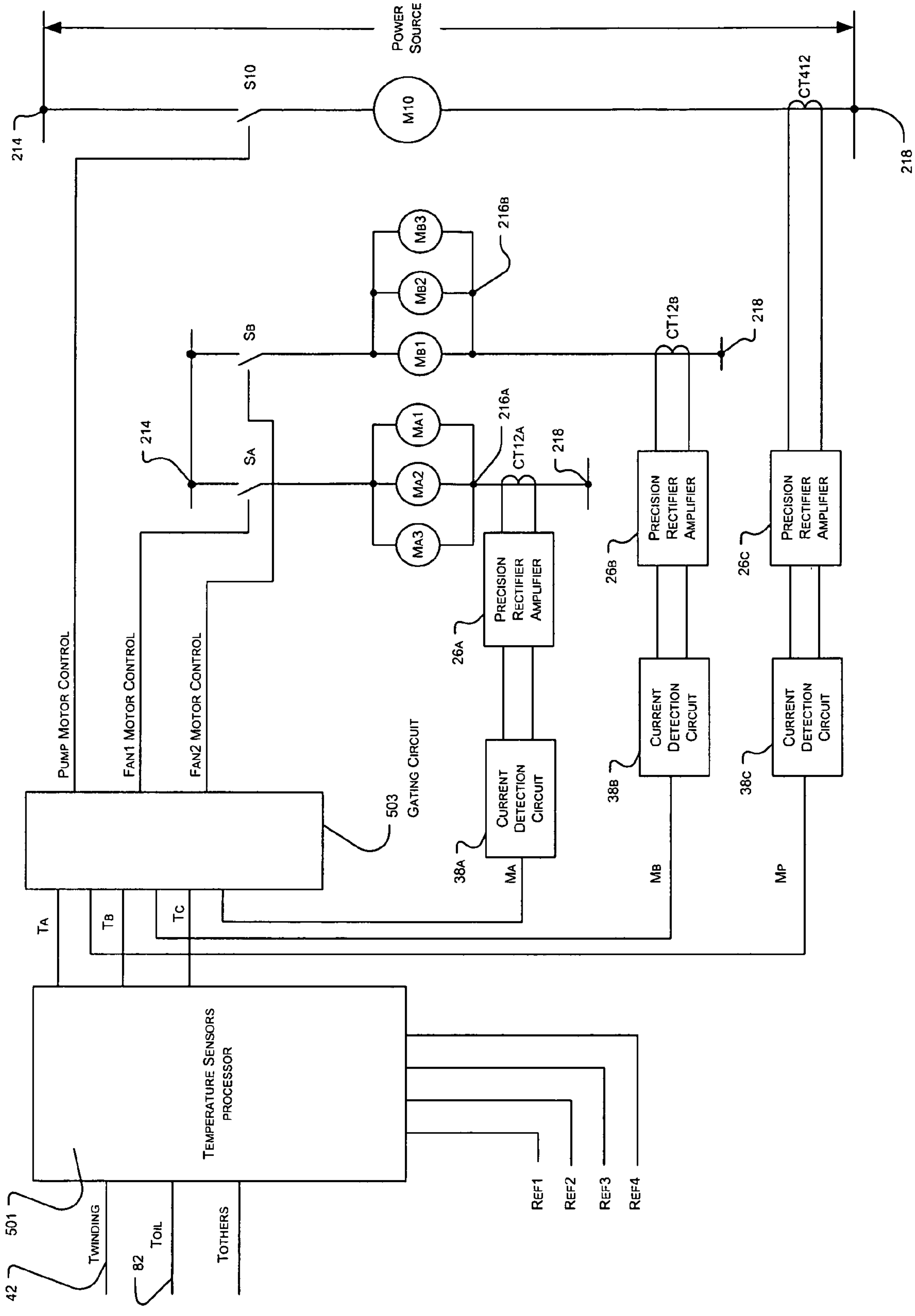
FIG. 5 is a more detailed block diagram of a transformer monitoring and cooling system embodying the invention.

The system shown in FIG. 5 is an expanded version of FIGS. 3B and 4B in that it shows two sets of fans (MAi, MBi) and two current transformers (CT12A and CT12B) to sense the currents in their corresponding sets of fans. Like the previous figures, FIG. 5 illustrates the turning on of cooling devices in a predetermined sequence and the concurrent sensing of the "operability" of the cooling devices in order to substitute "good" devices for malfunctioning devices.

Figure 5A:
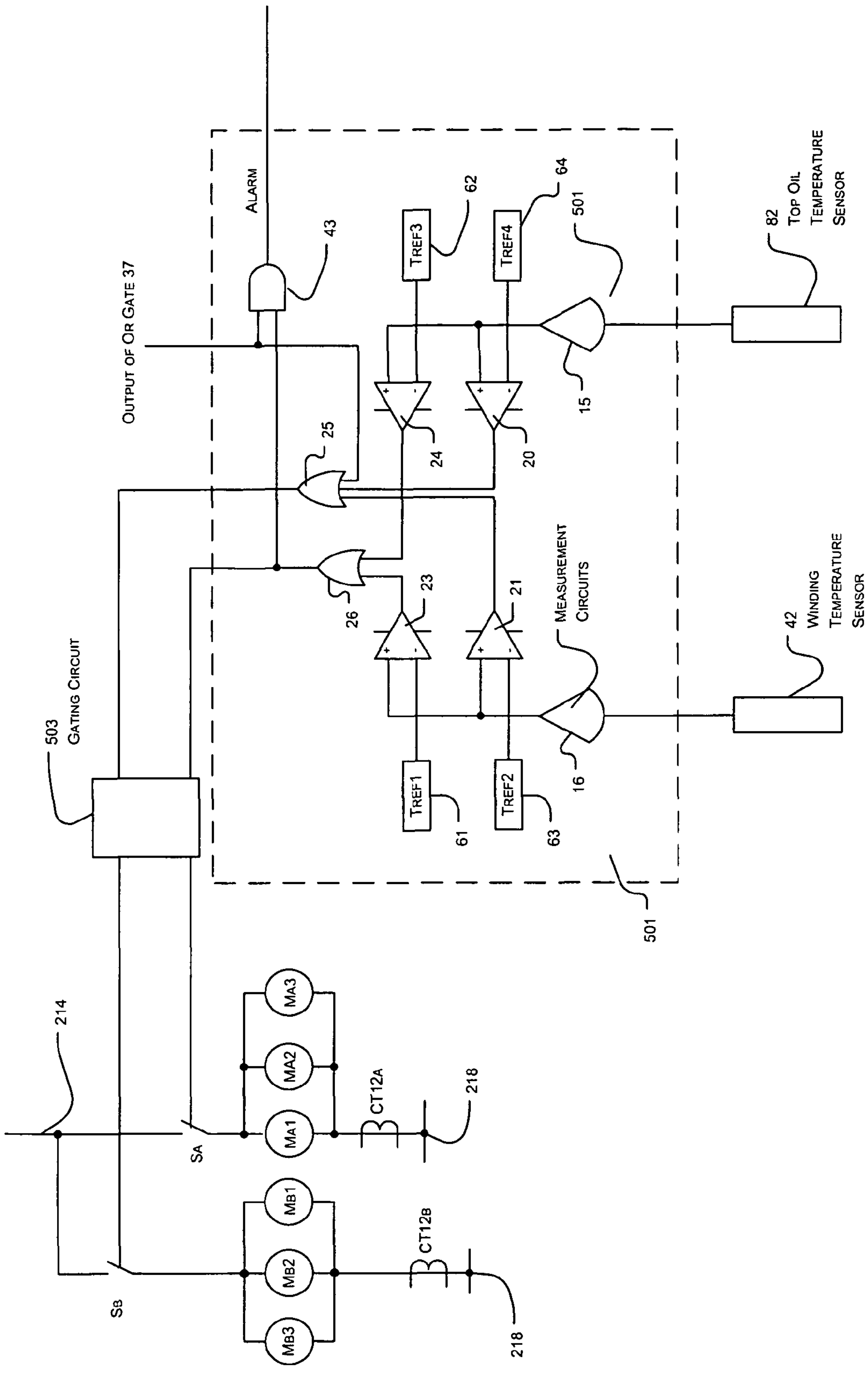
FIGS. 5A and 5B are more detailed circuit diagrams of portions of the circuit of FIG. 5.

Circuit 501 of FIG. 5, which corresponds generally to circuits 210 and 410, is responsive to signals from temperature sensors (42, 82) to produce control signals to turn on corresponding cooling devices, if the cooling devices are not defective. FIG. 5A shows how a portion of circuit 501 may be configured to produce signals indicative of the need to provide cooling (i.e., a predetermined temperature has been reached). Thus, signals from a sensor 42 (winding temperature) are applied to a measuring circuit 16 and signals from sensor 82 (top oil temperature) are applied to a measuring circuit 15. The output of circuit 15 is applied to the non-inverting inputs of comparator circuits 20 and 24. The output of circuit 16 is applied to the non-inverting inputs of comparator circuits 21 and 23. A reference signal Tref1 is applied to the inverting input of comparator 23; a reference signal Tref2 is applied to the inverting input of comparator 21; a reference signal Tref3 is applied to the inverting input of comparator 24 and a reference signal Tref4 is applied to the inverting input of comparator 20. These reference signals may be determined by the transformer manufacturer or the operator of the transformer to set the temperature(s) at which the first and second stage of cooling are applied to the transformer.

FIGS. 5 and 5A show two stages of cooling; one stage of cooling is provided by a first set/bank of fans MA and the second stage of cooling is provided by a second set/bank of fans MB. The first set of fans MA is activated when switch SA is closed. The second set of fans MB is activated when switch SB is closed.

Assuming that the cooling devices are all operating correctly, Switch SA is closed when a signal from sensor 42 exceeds reference signal Tref1 or when a signal from sensor 82 exceeds reference signal Tref3. When Tref1 is exceeded, the output of comparator 23 goes from a logic "0" condition to a logic "1" condition which signal is applied to an OR gate 26 whose output is used to enable switch SA whose closure causes power to be applied to the first set of fans MA. The first set of fans may also be activated when a signal from sensor 82 exceeds a reference signal Tref3. When that occurs, the output of comparator 24 goes from a logic "0" condition to a logic "1" condition which signal is applied to OR gate 26 whose output is fed to gating circuit 503 whose output controls switch SA which will be enabled and power the first set of fans MA (if these fans are not malfunctioning).

When the signal at the output of circuit 16 exceeds Tref2, the output of comparator 21 goes from a logic "0" condition to a logic "1" condition which signal is applied to OR gate 25 whose output is fed to gating circuit 503 whose output controls switch SB which will be enabled and power the second set of fans MB (if these fans are not malfunctioning). Likewise, when the signal at the output of circuit 15 exceeds Tref4, the output of comparator 20 goes from a logic "0" condition to a logic "1" condition which signal is applied to OR gate 25 whose output is fed to gating circuit 503 whose output controls switch SB which will be enabled and power the second set of fans MB (if these fans are not malfunctioning).

The above describes the intended normal operation of the cooling fans in stages as a function of increases in temperature, when additional cooling is required and for the condition that the cooling devices are all functioning as intended.

Figure 5B:
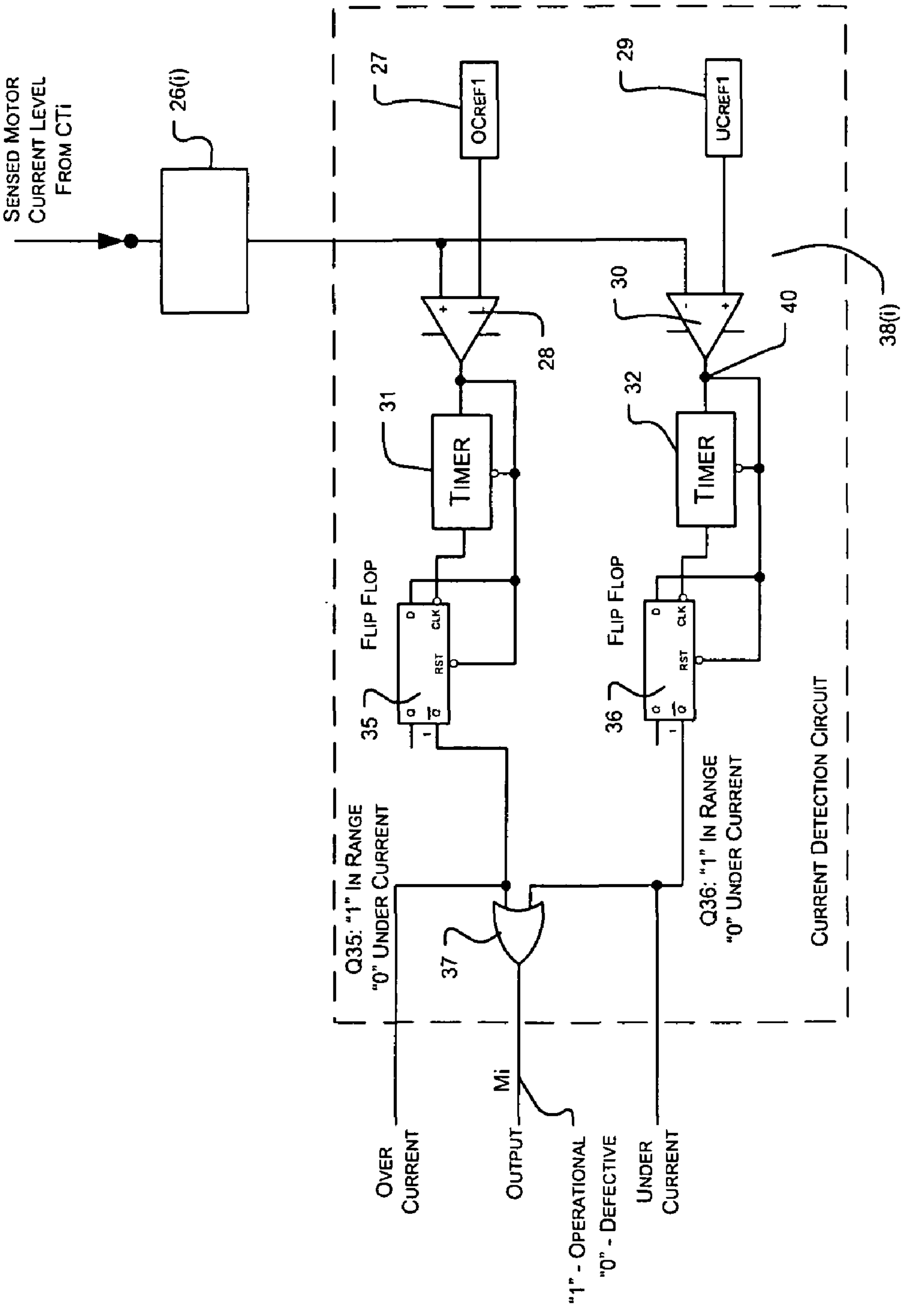

As already noted, in circuits embodying the invention, the application of power to cooling devices is a function of: (a) the temperature level requirement; and (b) the operability of the cooling device. Thus, in order for any of the switches SA and SB to be enabled gating signals have to be generated which indicate that their corresponding cooling devices are operational ("working"). The gating signals are generated by sensing the currents flowing in the motors of the cooling devices. In FIG. 5, motor currents are shown to be sensed by current transformers CT12A, CT12B, and CT412. The outputs of the current transformers are supplied to respective precision rectifier amplifiers (26A, 26B, 26C) for initially processing and digitizing the sensed signals. The outputs of the rectifier circuits (26*i*) are then supplied to respective current detection circuits (38*i*) which function to determine whether the sensed current signal is either: (a) within a prescribed range; (b) an undercurrent (below the prescribed range which is indicative of a full or partial open circuit condition); or (c) an overcurrent (above the prescribed range which is indicative of a full or partial short circuit condition). Each one of the current detection circuits (38A, 38B, 38C) may be as shown in FIG. 5B. Each circuit includes a comparator 28 to which is supplied an overcurrent reference 27, and a comparator 30 to which is supplied an undercurrent reference 29. The values of the reference levels may be dictated by the motor manufacturers and/or derived from the specifications of what constitutes acceptable or non acceptable operation of the components. The two comparators determine whether the sensed motor current is either: (a) within a prescribed range; (b) too low, i.e., below a predetermined level, indicative of one type of malfunction, such as an open circuit; or (c) too high low (i.e., above a predetermined level, indicative of another type of malfunction, such as a short circuit. The outputs of the comparators are fed to additional circuitry such as timers (e.g., one-shots) 31, 32 and flip-flops 35, 36 whose outputs are fed to an OR gate 37 to produce an output shown as Mi. For purpose of illustration when Mi is a logic "1" it signifies that the sensed motor current is within an acceptable range (indicative of operability) when Mi is a logic "0" it signifies that the sensed motor current is outside an acceptable range (too low or too high) indicative of a malfunction. Note that the nature of the malfunction, whether the current is too high or too low, may be obtained by using the output of the flip flops 35 and 36. Use of this feature is not explicitly shown, though it may be used to practice the invention.

Figure 5C:
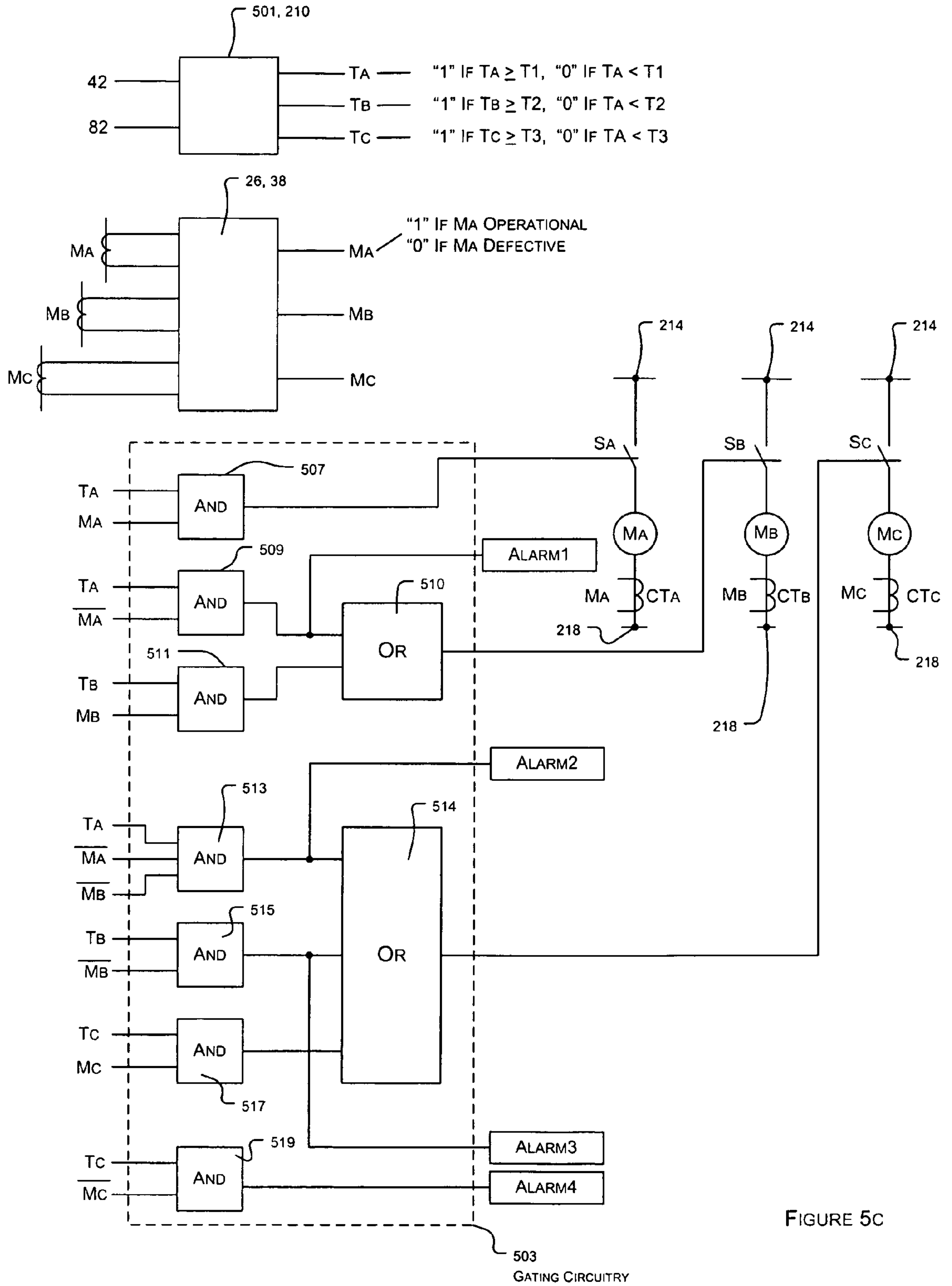
FIG. 5C is a partial logic diagram illustrating some of the functions performed in circuits embodying the invention.

The outputs (e.g., Mi) generated by detection circuits (38*i*) may be combined with a selected output signal (TA, TB or TC) of the temperature processor (501, 210) in a gating arrangement 503 to control the sequencing of the switches applying power to the motors and to generate appropriate alarm signals as outlined in FIG. 5C.

FIG. 5C outlines some of the function which can be performed using the various circuits shown in FIGS. 3A, 3B, 4A, 4B, 5, 5A and 5B for the condition of 3 sets of fans (MA, MB, MC) which are intended to be turned-on in sequence and for 3 different temperature levels (T1, T2, T3).

The temperature of pertinent points/parts of the system is sensed by temperature sensors (e.g., 42, 82) which are coupled to corresponding temperature sensing modules (210, 410, 510) to produce signals (TA, TB or TC) to indicate whether the temperature is above a first level (T1), a second level (T2) or a third level (T3). If there are no defects, when TA is a logic 1 switch SA is to be closed, when TB is a logic 1 switch SB is to be closed, and when TC is a logic 1 switch SC is to be closed. However, in accordance with the invention these switches will only be closed if no malfunction of the cooling devices is detected.

The system also includes means [modules 190, 490, 26(*i*) and 38(*i*)] for sensing and storing information regarding the status of the motors operating the cooling devices and for producing signals indicative of the functioning or malfunctioning of the devices. For ease of illustration, the signal for motor MA is also shown as MA, motor MB as MB and motor MC as MC. Also, if a motor is functioning within its prescribed range its corresponding signal (Mi) is defined as a logic "1"; if it is operating outside its prescribed specification its corresponding signal is defined as a logic "0".

The gating circuitry 503 may be an integrated circuit (IC) microprocessor or any discrete logic circuit which includes the circuitry needed to perform the functions shown in FIG. 5C and FIGS. 3A, 3B, 4A, and 4B.

1. Turn-on of SA and Powering MA:

Thus, when TA is a logic "1" (indicating that cooling is required) and MA is a logic "1" (indicating that MA is functional) an AND type circuit 507 produces a signal to turn-on switch SA and power motor MA. If MA is logic "0" (indicating that MA is malfunctioning) the switch SA may be turned off (whether there is an undercurrent or overcurrent condition).

2. Turn-on of SB and Powering MB:

(a) However, note that the need for cooling which exists is taken care of as follows. When TA is a logic "1" and if MA is a logic "0", [MA(BAR) is a logic "1" ] indicating that motor MA is malfunctioning, the output of an AND type circuit 509 produces a signal applied to an OR type circuit 510 to turn-on switch SB and power motor MB. Concurrently, an Alarm 1 circuit may also be activated to record and report the malfunction of motor MA.

(b) When TB is a logic "1" and MB is a logic "1" an AND type circuit 511 produces a signal coupled via OR circuit 510 to turn-on switch SB and power motor MB.

3. Turn-on of SC and Powering MC:

(a) When TA is a logic "1" and if MA and MB are a logic "0", indicating that motors MA and MB are malfunctioning, the output of an AND type circuit 513 produces a signal applied to an OR type circuit 514 to turn-on switch SC and power motor MC. If MA and MB are logic "0" (indicating that MA and MB are malfunctioning) the switches SA and SB may be turned off (whether there is an undercurrent or overcurrent condition). Concurrently, an Alarm 2 circuit may also be activated to record and report the malfunction of motors MA and MB.

(b) When TB is a logic "1" and if MB is a logic "0", indicating that motor MB is malfunctioning, the output of an AND type circuit 515 produces a signal applied to OR type circuit 514 to turn-on switch SC. If MB is logic "0" (indicating that MB is malfunctioning) the switch SB may be turned off (whether there is an undercurrent or overcurrent condition). Concurrently, an Alarm 3 circuit may also be activated to record and report the malfunction of motor MB.

(c) When TC is a logic "1" and MC is a logic "1" an AND type circuit 517 produces a signal coupled via OR circuit 514 to turn-on switch SC and power motor MC.

Although it may not have been explicitly shown for all instances, It should be noted that when a cooling device is found to be defective, particularly when the defective condition is due to a short circuit condition, that the switch applying power to the defective cooling device will be disabled to prevent the application of power to the device.

The information pertaining to a defective cooling device may be stored in memory and the device turned off until it is replaced. Or the operability of the device may be tested periodically to determine whether its defective condition has changed.

The invention has been illustrated using cooling devices having motors and using means (e.g., current transformers) to sense the current in the motors. It should be appreciated that the invention may be practiced with any cooling device whose current and/or voltage and/or power usage can be sensed to determine the operability or malfunctioning of the device.

The invention has been illustrated using radiators. But any other type of heat exchanger can be used to practice the invention.

What is claimed is:

1. A combination comprising:

a power transformer contained within a housing; said power transformer generating heat when supplying power to a load;

N cooling devices operable in a predetermined sequence for providing cooling to the power transformer and preventing its temperature from exceeding predetermined limits, each cooling device having a motor and being operated by its corresponding motor which is energized in a predetermined sequence when a predetermined temperature is exceeded;

means for sensing the current through the motors of the cooling devices to determine their operability when energized;

means responsive to a malfunction in any one of said cooling devices for automatically powering another cooling device instead of a malfunctioning cooling device, independent of a change in temperature due to the malfunction; where N is an integer equal to or greater than two (2).

2. A combination as claimed in claim 1, wherein the means for sensing the current through the motors of the cooling devices includes a current transformer connected in series with the motor of the cooling devices.

3. A combination as claimed in claim 2, wherein the means for sensing the current through the motors of the cooling devices includes means for processing the current flowing through the current transformer for ascertaining at least one of the functionality of the cooling device and the length of time the cooling device motor is operated.

4. A combination as claimed in claim 1, wherein said N cooling devices include N cooling fans positioned about said housing for cooling the power transformer when the temperature of the transformer is above a predetermined level; each one of said N cooling fans having a motor which is selectively powered to activate its corresponding fan; and wherein said means for sensing the current through the motors of the cooling devices includes means for sensing the current through the motors of said N cooling fans to determine whether the current is within a predetermined range such that it is above a first, minimum, level and below a second, maximum, level.

5. A combination as claimed in claim 4, wherein there is a switch in series with each cooling fan motor for selectively energizing the motors of said N cooling fans; and wherein said means for sensing the current through the motors of the cooling devices includes means for determining the operability of said motors when operated individually or in combination.

6. The combination as claimed in claim 4, wherein said N cooling, fans are powered in a predetermined sequence as a function of the rise in temperature of the power transformer.

7. The combination as claimed in claim 4, wherein said means for sensing the current flowing through the motors includes means for selectively testing the motors of each one of said N cooling fans in a predetermined sequence for ascertaining their operability and for identifying which motor is not operable.

8. The combination as claimed in claim 4, further including counting means for sensing the length of time a motor is turned on and for totaling the amount of time the motor is turned on.

9. The combination as claimed in claim 4, wherein N is greater than one, and wherein said means for sensing the current through the motors includes means for testing the motors individually and separately and means for energizing and substituting a good motor for a defective motor.

10. A combination as claimed in claim 1, wherein the housing containing the transformer is filled with a liquid for distributing the heat generated by the transformer; and wherein the cooling device includes a pump for circulating the liquid, said pump being driven by a pump motor; and wherein said means for sensing the current through the motor of the cooling device includes means for sensing the current through the pump motor.

11. A combination as claimed in claim 10, wherein said housing includes a heat exchanger through which the liquid is passed by means of said pump operated by said pump motor; and wherein N cooling fans are positioned about said radiator for cooling the power transformer when the temperature of the transformer is above a predetermined level; each one of said N cooling fans having a motor which is selectively powered to activate its corresponding fan.

12. A combination as claimed in claim 10, wherein said means for sensing the current through the motor of the cooling device includes a current transformer connected in series with the motors of the cooling fans to sense their current levels.

13. A combination as claimed in claim 12, wherein a switch is connected in series with each fan motor to enable each motor to be individually enabled or disabled in order to test each motor and to selectively substitute one motor for another.

14. A combination comprising:

a power transformer contained within a housing; said power transformer generating heat when supplying power to a load;

a cooling system associated with the power transformer for cooling the power transformer and preventing its temperature from exceeding predetermined limits, said cooling system including at least two cooling devices which are operated in a given sequence; each device having a corresponding motor which is energized when a given temperature is exceeded; and means for sensing the current through the motors of the cooling devices to determine the operability of the cooling devices, when energized, and for automatically substituting an operational cooling device for a malfunctioning cooling device regardless of the given sequence.

15. A combination as claimed in claim 14, wherein the housing containing the transformer is filled with a liquid for distributing the heat generated by the transformer; and wherein the cooling system includes a pump for circulating the liquid, said pump being driven by a pump motor; and wherein said means for sensing the current through the motor includes means for sensing the current through the pump motor.

16. A combination as claimed in claim 15, wherein each one of said at least two cooling devices includes cooling fans positioned about said housing for cooling the power transformer when the temperature of the transformer is above a predetermined level; each one of said cooling fans having a motor which is selectively powered by means of switching circuitry to selectively power the switch when a predetermine temperature is reached and to also enable the determination of the operability of each motor and the substitution of a good motor for a defective one.

17. A cooling system for a power transformer includes a first cooling device having a first motor which is normally powered by the turn on of a first switch when a first temperature (T1) is exceeded and a second cooling device having a second motor which is normally powered by the turn on of a second switch when a second temperature (T2) is exceeded; where T2 is greater than T1; means for sensing the current through the first motor and through the second motor to determine the operability of the first motor and the operability of the second motor; and means responsive to the malfunction of the first motor for automatically turning on the second switch and powering the second motor, even where the temperature is below T2; and wherein the cooling device includes at least one of N cooling fans each having its own motor and also includes a pump with a pump motor for operating the pump and further including means for selectively sensing the current level in each one of said motors to determine whether the current is within a predetermined range such that it is above a first, minimum, level and below a second, maximum, level.

18. A cooling system as claimed in claim 17 wherein said cooling devices are cooling fans.

19. A cooling system as claimed in claim 17 wherein said means for sensing the current through the first and second motors includes means for selectively testing the operability of the motors.

20. A cooling system as claimed in claim 17 further including means for monitoring and totaling the operating time of the motors.

21. A combination comprising:

a power transformer contained within a housing; said power transformer generating heat when supplying power to a load;

N cooling devices for providing cooling to the power transformer and preventing its temperature from exceeding predetermined limits, each cooling device having an energizing mechanism and being powered and operated in a predetermined sequence as a function of temperature by its corresponding energizing mechanism when a predetermined temperature is exceeded;

means for sensing at least one of the current and voltage associated with the powering and operation of each energized cooling device to determine if a cooling device is malfunctioning; and means responsive to a malfunction of said cooling device for automatically powering a functioning cooling device and substituting it instead of a malfunctioning cooling device, independent of a change in temperature and the predetermined sequence due to the malfunction; where N is an integer equal to or greater than two (2).

22. A combination as claimed in claim 21 wherein there is a selectively enabled switch associated with each cooling device for supplying power to its corresponding device; and wherein when a cooling device is malfunctioning its switch is turned off to prevent application of power to the cooling device.

* * * * *